United States Patent [19]

Fletcher et al.

[11] 4,018,092
[45] Apr. 19, 1977

[54] MECHANICAL SEQUENCER

[76] Inventors: James C. Fletcher, Administrator of the National Aeronautics and Space Administration, with respect to an invention of; Walter Thomas Appleberry, Long Beach, Calif.

[22] Filed: Feb. 17, 1976

[21] Appl. No.: 658,450

[52] U.S. Cl. .................................................. 74/96
[51] Int. Cl.[2] ........................................ F16H 21/44
[58] Field of Search ................. 74/55, 54, 53, 567, 74/66, 67, 68, 96

[56] References Cited

UNITED STATES PATENTS

| 810,174 | 1/1906 | Sittmann | 74/96 |
|---|---|---|---|
| 1,233,924 | 7/1917 | Selby | 74/66 |
| 2,019,158 | 10/1935 | Russell | 74/55 |
| 2,930,017 | 3/1960 | Arneson | 74/55 |
| 3,368,413 | 2/1968 | Vulliez | 74/55 |
| 3,427,888 | 2/1969 | Rheinlander | 74/55 |

*Primary Examiner*—Samuel Scott
*Assistant Examiner*—Wesley S. Ratliff, Jr.
*Attorney, Agent, or Firm*—Russell E. Schlorff; John R. Manning; Marvin F. Matthews

[57] ABSTRACT

A mechanical sequencer having a rotatable drive shaft. The drive shaft has a spline formed thereon. A freely rotatable shaft contains a plurality of rollers positioned thereon, the axis of the freely rotatable shaft having an axis parallel to and offset from the axis of the drive shaft. A drive fitting has an opening therein, the drive fitting being positioned on the drive shaft spline for rotating the fitting with the shaft. A finger is formed integral with the drive fitting for enabling the fitting to move the rollers and the freely rotatable shaft. A crank structure is positioned in a plane perpendicular to the axis of the drive shaft and the freely rotatable shaft. The crank structure has a drive shaft opening through which the drive shaft passes. The crank structure further contains a slot into which the freely rotatable shaft and one of the rollers extends for driving the crank structure during movement of the freely rotatable shaft. A sequencer housing has a track formed therein. The track forms a guideway for the freely rotatable shaft and another of the rollers positioned thereon.

14 Claims, 10 Drawing Figures

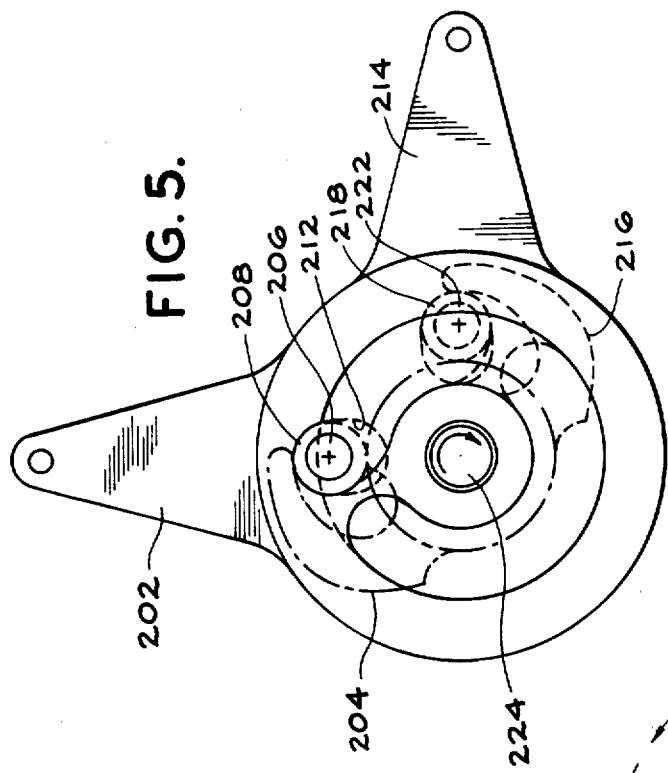
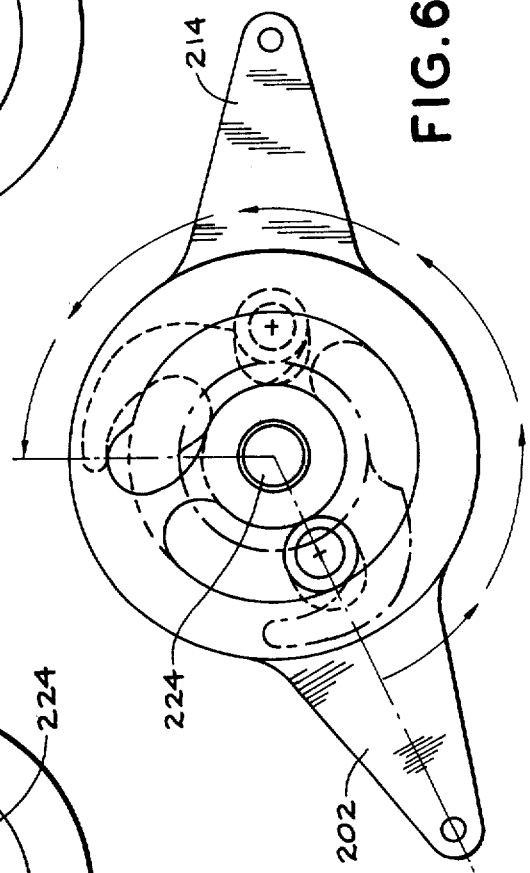
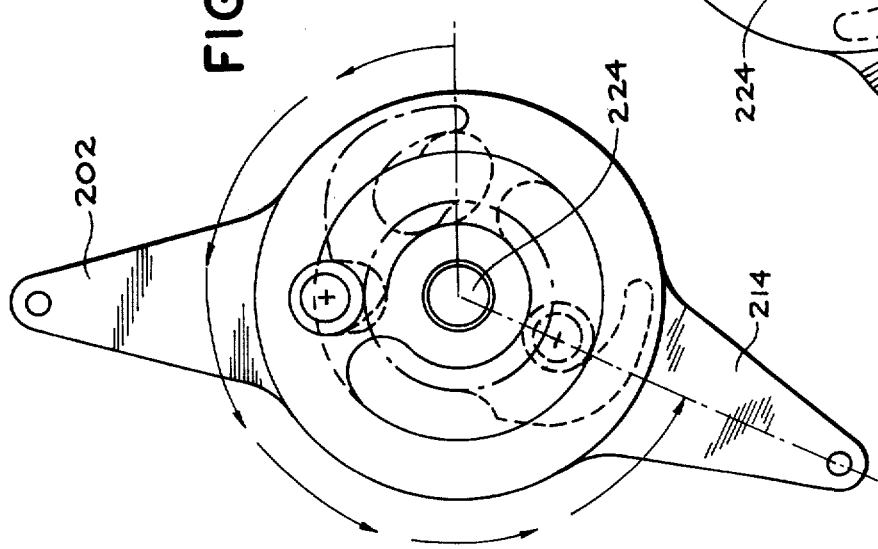
FIG. 5.
FIG. 6.
FIG. 7.

MECHANICAL SEQUENCER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

1. Field of the Invention

The field of art to which the invention pertains includes the field of mechanical sequencers, particularly with respect to a mechanical sequencer having a single continuous rotary input and two or more outputs of sequenced rotary motion.

2. Description of the Prior Art

Conventional prior art devices for providing two or more outputs of sequenced rotary motion have been found to be relatively bulky. Such devices as the Geneva mechanism and multilated gears have been found to be unsuitable for high loading. Further, certain of these devices such as the Geneva mechanism, the cam track and follower, or the slider-crank linkage exhibit a varying mechanical advantage as they are cycled. For example, the Geneva mechanism output torque drops sharply at mid-stroke. The output motion of the Geneva mechanism, the cam track and followers, and the multilated gears, is normally not adjustable.

The present invention provides a mechanical sequencer which can be utilized with high loads. The device is relatively compact and is of an in-line design. The mechanical sequencer has a constant torque output throughout its cycle and its output torque is the same as that of the power source. The mechanical sequencer is fully adjustable for output stroke angle and location of stop-start points. Where more than one output is used, the relative motions are adjustable for end-to-end movement, overlapping motion, and overlapping dwell.

SUMMARY OF THE INVENTION

A mechanical sequencer module having a rotatable drive shaft. A shaft spline is formed on the drive shaft. A freely rotatable shaft has a plurality of rollers positioned thereon, the axis of the freely rotatable shaft having an axis parallel to and offset from the axis of the drive shaft. The drive fitting has a splined opening therein. The drive fitting is positioned on the drive shaft spline for rotating the fitting upon rotation of the drive shaft. A finger is formed integral with the drive fitting for enabling the fitting to move the rollers and the freely rotatable shaft. A crank structure is positioned in a plane perpendicular to the axes of the drive shaft and the freely rotatable shaft. The crank structure has a drive shaft opening through which the drive shaft passes and a slot into which the freely rotatable shaft and one of the rollers extends for driving the crank structure during movement of the freely rotatable shaft. A sequencer housing has a track which provides a guideway for the freely rotatable shaft and another of the rollers.

The advantages of this invention, both as to its construction and mode of operation, will be readily appreciated as the same becomes better understood by reference to the following detailed description when considered in connection with the accompanying drawings in which like reference numerals designate like parts throughout the Figures.

BRIEF DESCRIPTION OF THE DRAWINGS

FIG. 5 is an end view of a pair of adjacent modules with a portion of the housing removed;

FIG. 6 is an end view of the modules of FIG. 5 in a first operational position;

FIG. 7 is an end view of the modules of FIG. 5 in a second operational position;

DESCRIPTION OF THE PREFERRED EMBODIMENTS

Figure 1:
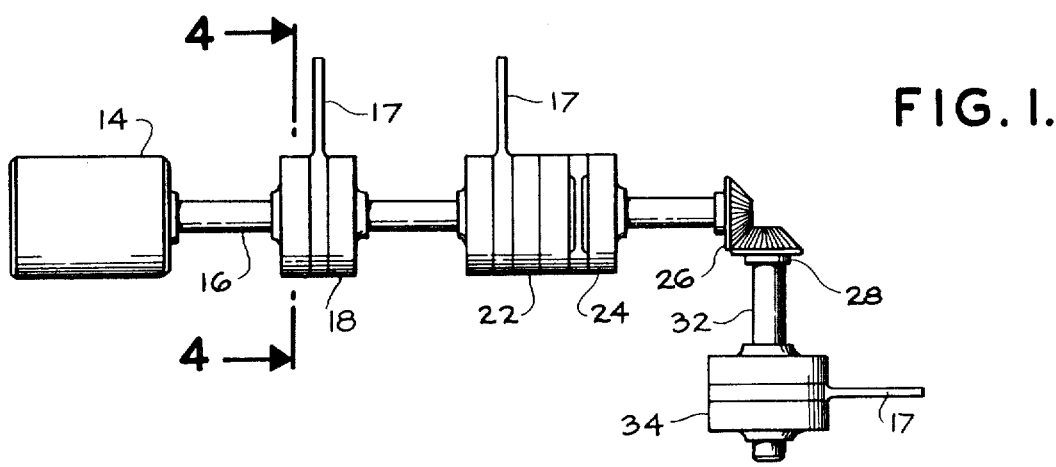
FIG. 1 is a plan view of the system utilizing a plurality of mechanical sequencing modules constructed in accordance with the principles of the invention.

Referring now to the drawings there is shown in FIG. 1 a mechanical sequencing system which utilizes a plurality of the modules which are constructed in accordance with the principles of the invention. As illustrated in FIG. 1, a drive motor 14 has an output shaft 16 connected thereto. The output shaft 16 has an axis perpendicular to the plane of a module crank arm 17. As illustrated in FIG. 1 for a typical system, there is a first module 18 and a pair of adjacent modules 22 and 24. The shaft 16 terminates at a drive gear 26 which in turn is illustrated as meshing with a driven gear 28. The drive gear 28 in turn is attached to a second shaft 32 which in turn passes through a fourth module 34. Thus, as can be seen, the entire system is flexible and the modules need not be aligned in parallel planes but can be offset at any desired angle as illustrated in FIG. 1. Each module controls rotary movement of crank arm 17 associated therewith. In addition, it should be noted in FIG. 1 that the modules can be adjacent, such as modules 22 and 24 or spaced apart, such as the modules 18 and 34.

Figure 2:
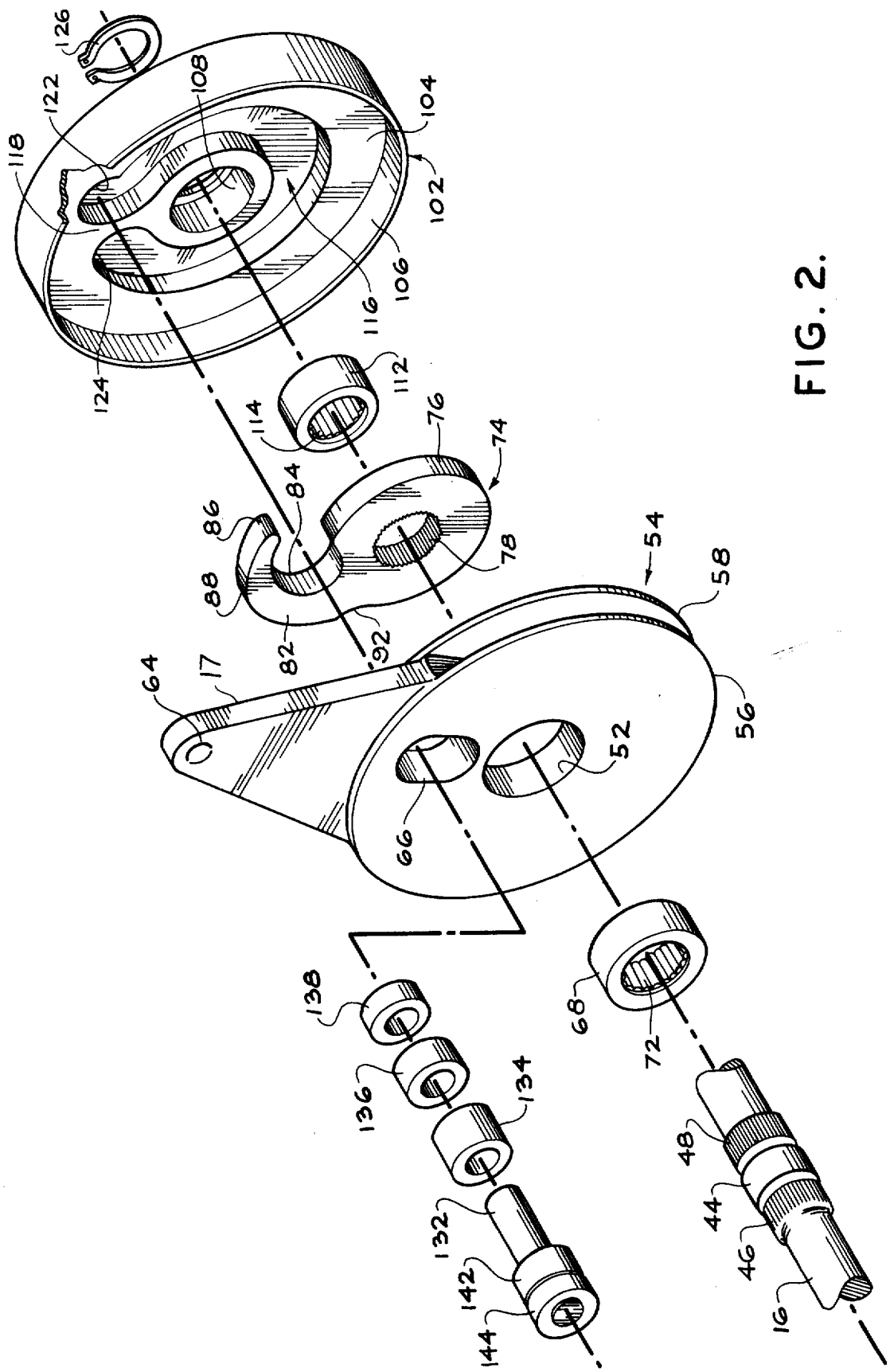
FIG. 2 is a partial exploded perspective view of a portion of the mechanical sequencer modules of FIG. 1.

Referring now to FIG. 2 there is illustrated a module in exploded perspective view with a portion of the left side thereof removed. The module of FIG. 2 is of the type illustrated in FIG. 1 but shown in greater detail. The drive shaft 16 which is driven by the motor 14 of FIG. 1 contains an enlarged central collar 44, and a left input shaft spline 46 and a right input shaft spline 48 on either side thereof. The drive shaft 16 extends through a central opening defined by a collar 52 of a crank structure 54.

The crank structure 54 is formed of a pair of disks 56 and 58 spaced apart by means of the collar 52 and may be integrally machined, welded or otherwise secured thereto. The generally triangular crank output arm 17 extends from the edge of the periphery of the disks 56 and 58 with the base of the triangular shaped crank output arm being integrally machined, welded or otherwise secured between the disks. A circular opening 64 is formed at the apex of the crank output arm and may be used to secure a member which is moved by the crank output arm. The crank structure 54 further comprises a radially extending slot 66 which is formed in the disk portion of the crank structure. The radially extending slot 66 is normally intermediate the collar 52 and the exteriorally extended triangular portion of the crank output arm 17.

A central needle bearing 68 is positioned in the collar 52 and contains an interior bearing surface 72. The shaft 16 is positioned so that the enlarged central collar 52 can move with respect to the bearing surface.

A right drive fitting 74 is positioned against the crank structure disk 58 exterior surface. The right drive fitting 74 contains a generally cylindrical base 76 having a center drive fitting keyway 78 which can be adjustably positioned on the right input shaft spline 48. A cam shaped finger 82 extends from the periphery of the base 76 and defines a clockwise roller drive surface 84 which is partially enclosed by the tip 86 of the finger 82. The exterior surface 88 of the finger forms a smooth cam surface and contains a sharp depression 92 which forms the transition between the exterior surface of the cylindrical base 76 and the cam shaped surface 88 of the finger.

A righ cup shaped end housing 102 forms one side of the module and contains an end wall 104 and a side wall 106. The end wall 104 contains a central opening 108 into which a right end needle bearing 112 is positioned. The needle bearing 112 contains an interior bearing surface 114 which enables the shaft 16 to extend therein and rotate with respect to the end housing 102. A right housing track 116 is formed in the end wall 104 of the housing and surrounds the central opening 108. The track 116 termini are separated by means of a housing integral spacer section 118 formed in the end housing 102 so that the track is not a continuous path. One end of the right housing track contains a radially outward extending first lock notch 122 having a thickness approximately equal to the track 116 and forming a continuation thereof. The other end of the housing track is defined by a full radius notch 124 which is tangent at the terminus of the track 116. A locking washer 126 abuts the exterior surface of the end wall 104 enabling the housing 102 to be correctly positioned on the shaft 116.

A freely rotatable shaft 132 is formed by a cylindrical rod and contains a plurality of rollers rotatably mounted thereon. The rollers are positioned adjacent each other and are formed of cylindrical disks of equal diameters. The central roller 134 is positioned so that it is movable in the radially extending crank slot 66. The right intermediate roller 136 is positioned in the plane of the right drive fitting and is movable from the drive fitting drive surface 84, along the cylindrical base 76 to the sharp depression 92. The right end roller 138 is positioned so that it is movable in the right end housing track 116.

Additionally each module contains a left drive fitting and a left cup shaped end housing (not shown in FIG. 2) which are positioned as will be explained hereinafter so that the module of FIG. 2 is symmetrical about the crank structure 54, producing balanced load paths in the module. Thus, the left intermediate roller 142 is positioned in the plane of the left drive fitting and the left end roller 144 is positioned in a track formed in the left cup shaped housing. Moreover, the left input shaft spline 46 is used to drive the left drive fitting.

Figure 3:
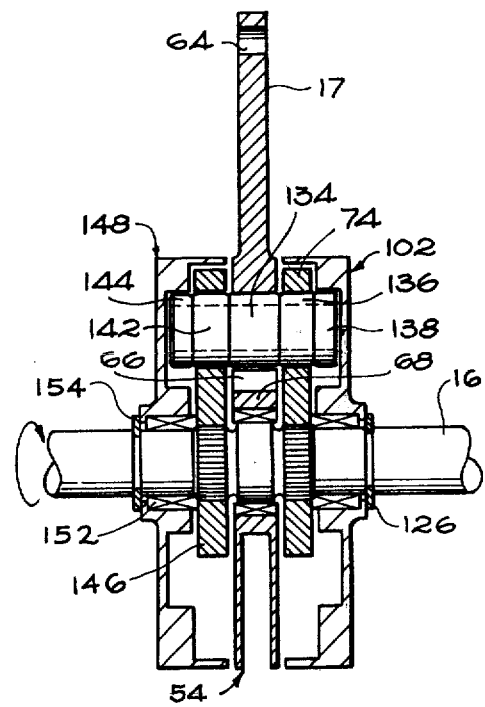
FIG. 3 is a cross-sectional view of one of the mechanical sequencing modules taken along the line 3—3 of FIG. 4.

The left drive fitting 146 is illustrated in the cross-sectional view of an assembled module in FIG. 3. FIG. 3 also illustrates the left end housing 148 which contains a left end needle bearing 152 therein. A locking washer 154 is positioned on the shaft 16 adjacent the exterior surface of the left end housing, the locking washer 126 and the locking washer 154 retaining the module structures together on the shaft 16 in a fixed position.

Figure 4:
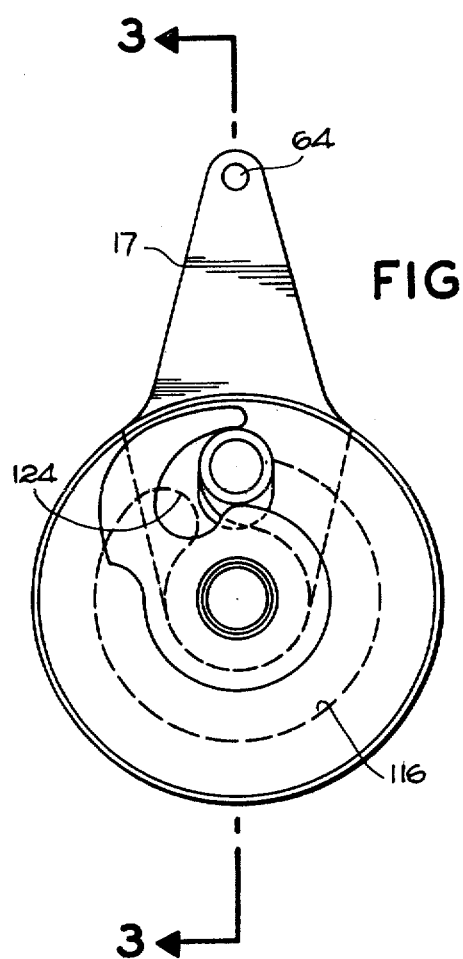
FIG. 4 is a cross-sectional view of one of the mechanical sequencing modules taken along the line 4—4 of FIG. 1.

FIGS. 3 and 4 illustrate an example of module movement where only a single output module is employed. As can be seen clearly in FIG. 4 the roller set on the freely rotatable shaft 132 is positioned so that the end roller 138 is in the first lock notch 122 of the housing track 116 of the right end housing 102. Similarly, the end roller 144 is positioned in the respective first lock notch of the left end housing 148. As previously explained, the drive fittings 74 and 146 are splined to rotate with the shaft 116. Assuming counterclockwise rotation of the drive shaft 16 at the instant shown in FIGS. 3 and 4, the maximum dwell stroke of the crank structure 54 is accomplished with the roller set remaining in the lock notches 122 of the end housing. The drive shaft 16 and the drive fittings 74 and 146 rotate until the exterior surface of each drive fitting base 76 adjacent the depression 92 abuts the rollers 136 and 142, respectively. Since these rollers are still in the locked position of FIG. 4, no further movement of the drive shaft 16 or the fittings 74 and 146 can occur.

Assuming clockwise rotation of the shaft 16, in the position shown in FIGS. 3 and 4, the end rollers 138 and 144 begin to descend out of the housing track first lock notch 122, while the intermediate rollers 136 and 142 move into the roller drive surface 84 of the drive fittings 74 and 146, respectively. Simultaneously, the central roller 134 moves in the radially extending slot 66 of the crank structure 54. The center roller 134 bears against the radially extending slot 66 causing the crank 54 to move. The slot length of the radially extending slot 66 permits radial displacement of the roller set as the rollers 138 and 144 move out of the housing track first lock notch 122. Thus, the crank structures 54 begins to move with the first clockwise movement of the drive fittings 74 and 146. The end rollers 138 and 144 then enter the circular portion of the housing track 116. The intermediate rollers 136 and 142 rest against the partially enclosed fitting drive surface 84 as the end rollers 138 and 144 move along the housing track.

Assuming a clockwise rotation of the shaft of approximately 340°, the crank 54 rotates approximately 315°, the angular difference of 25° being caused by the first 15° of the crank motion which requires 40° of input motion. This 25° difference is a result of interaction between the radial displacement of the roller set in the radially extending slot 66 and the cam action caused by the drive fitting configuration. Cam action, which occurs only in the transition region, starts and terminates crank motion by accelerating from or decelerating to zero sinusoidally, thereby preventing shock loads on the mechanism. As illustrated in FIGS. 3 and 4 when the 340° clockwise shaft rotation has been completed, the end rollers 138 and 144 are positioned in the second lock notches of the end housings 102 and 148 respectively. Counterclockwise rotation of the shaft 16 at this time will reverse the movement just described until completion of the 340° rotation of the shaft whereupon both the rollers associated with the freely rotatable shaft 132 and the drive fittings 74 and 146 return to the position shown in FIG. 4. While not shown in the drawings, the end housings 102 and 148 are secured to a common fixed mounting surface to prevent rotation of the housings.

As can be seen, the rollers move radially for latching and circumferentially for driving with the rollers being controlled by the cam shaped finger of the drive fittings, the radial slot in the crank structure, and by the tracks in the housings. Accordingly, shock loads on the mechanism are prevented since cam action, which occurs only in the transition region, starts and terminated by accelerating from or decelerating to zero sinusoidally. Having the centrally located crank structure 54 with drive fittings 74 and 146 on either side results in a balanced load system. Having drive fittings 74 and 146 splined directly to input shaft 16 and coupled through the rollers directly to output crank 54 results in a constant torque output. Due to inline design, i.e., the rotary actuator being on the same centerline with the output modules, size and weight are reduced.

Movement of output crank arm 17 relative to movement of input drive shaft 16 is fully adjustable. The adjustment is obtained by positioning of the spline connections. If a venier spline is utilized full circumferential adjustment may be obtained. When more than one output module 18 is utilized, they can be assembled and adjusted so that there is end-to-end movement (one starts when the other stops), overlapping movement (one starts before other stops), or overlapping dwell (one stops before other starts).

Referring now to FIG. 5, there is illustrated a pair of identical modules adjusted for end to end output motion of the respective crank arm; that is when one crank arm stops, the other crank arm commences movement. Both the front module 192 and the rear module 194 of FIG. 5 are identical to that of the module in FIGS. 2 through 4. The end view of FIG. 5 is shown with a portion of the front housing half removed for purposes of clarity. For clarity FIGS. 5 through 10, hidden portions of the front module 192 and rear module 194, are shown by means of phantom and dashed lines, respectively.

FIG. 5 comprises a front crank arm 202 which is driven by the front module drive fittings 204. Since both members of the pair of drive fittings of the front module are in the identical position in FIG. 5, the pair will be viewed and will be referred to as the front drive fitting. Similarly, since both members of the pair of drive fittings of the rear module are in another identical position in FIG. 5, the pair will be viewed and will be referred to as the rear drive fitting. The front module drive fitting 204 is used to move the front freely rotatable shaft 206 and its associated roller set 208 along the front module housing track 212. The rear crank arm 214 is driven by the rear module drive fitting 216 causing movement to the rear roller set 218 and its associated shaft 222. However, the rear module has been assembled so that the drive fitting 216 and the housing is in a mirror image position to that of the front module drive fitting 204. Further, the rear module drive fitting 216 and its associated crank arm 214 have been rotated 90° in a clockwise direction with respect to the front module drive fitting 204 and its associated crank arm 202. (Alternate positions could also be achieved by rotation of the module housing).

The front and rear modules are shown with their respective crank arms and drive fittings at a transition point. In FIG. 5 clockwise input of the drive shaft 224 causes the front crank arm 202 to move whereas counter-clockwise movement will move the rear crank arm 214. Since the front drive fitting 204 and the rear drive fitting 216 are splined to the common input shaft 224, the drive fittings will move in the same direction at all times. In FIG. 5 when one crank arm dwells the other crank arm moves. The drive fittings are limited to a 270° dwell stroke since the dwell drive fitting will abut its roller set. Limit switches could be used to decelerate shock. However, in the transition regions as illustrated in FIG. 5, acceleration or deceleration to zero sinusoidally occurs by cam action as previously discussed. The crank arm stroke is therefore 270° minus 25° or 245°.

FIGS. 6 and 7 illustrate the end-to-end sequencing of the crank arms of the arrangement of FIG. 5 during a full stroke cycle. In FIG. 6, with a counterclockwise input, the front crank arm 202 first moves 245° while the rear crank arm 214 dwells. At this point, both crank arms are at the transition point shown in FIG. 5. Further counter-clockwise motion moves the rear crank arm 245° while the front crank arm dwells. The end of the counter-clockwise stroke is shown in FIG. 7. Reversing the direction of the shaft 224 reverses the sequence. The rear crank arm 214 moves first, then the front crank arm 202 moves. It should be noted that the last crank arm to move counter-clockwise is the first to move clockwise. Thus, both crank arms move in the same direction as the rotation of the drive shaft 224. The total input shaft rotation in either direction is therefore twice 270° or 540°.

Figure 8:
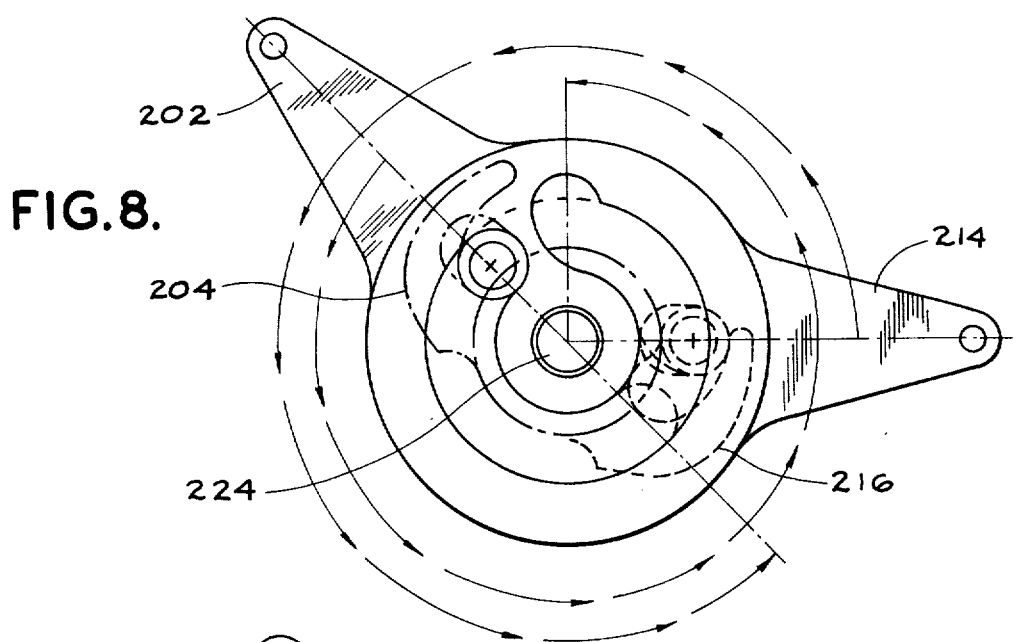
FIG. 8 is an end view of the modules of FIG. 5 rearranged to illustrate an alternative sequencing operation.

Referring now to FIG. 8, there is an end view of a pair of adjacent modules with the front housing again removed illustrating a sequencing operation wherein the crank arms move in overlapping output motions; that is, both crank arms move together during an overlap period. In FIG. 8, both the drive fittings and the crank arms have been positioned for maximum overlapping motions. In comparison to FIG. 5, the front drive fitting 204 has been reset on its spline, moving the front drive fitting 204 and the front crank arm 202 fully clockwise (340° and 315°, respectively). In FIG. 8 with a counter-clockwise rotation of the input shaft, both the front crank arm 202 and the rear crank arm 214 will move together 315°. The front crank arm 202 is driven at this time by the portion of the drive fitting 204 drive surface adjacent its cylindrical base. The drive fittings 204 and 216 will move 340°. The rear crank arm 214 moves first 15° while the front crank arm 202 is moving 40°. Both crank arms move at the same speed for the next 260°. The front crank arm 202 moves the last 15° while the rear crank arm is moving 40°. In the extreme setting of FIG. 8 there is no solo crank arm motion.

Figure 9:
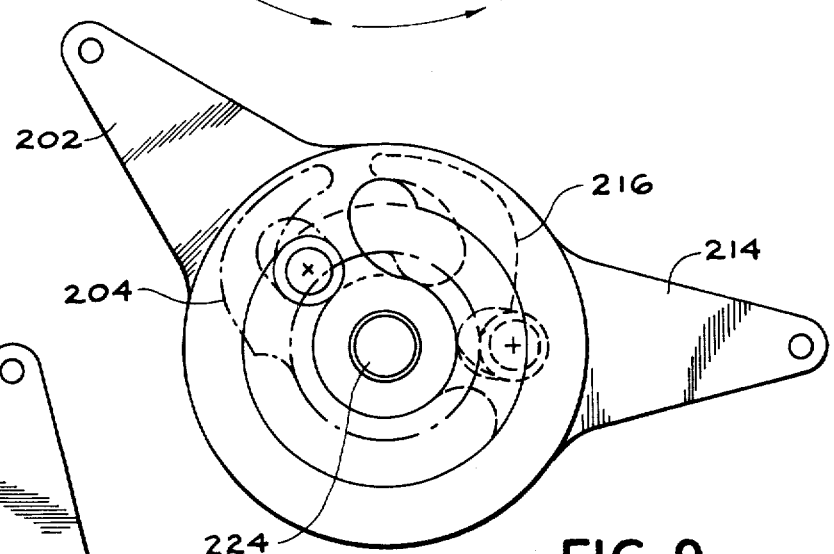
FIG. 9 is an end view of the modules of FIG. 5 rearranged to illustrate still another sequencing operation.

FIG. 9 illustrates an alternative arrangement of the overlapping output motion of FIG. 8 wherein the crank arms and drive fittings have been set for a maximum solo crank arm stroke. In comparison to FIG. 8 the rear module drive fitting 216 has been reset on its spline moving it fully clockwise 270°. In the counter-clockwise input sequence the front module crank arm moves alone 270°. Both crank arms then move 45° simultaneously while their drive fittings move 70° as the roller sets move in their respective radial slots. The rear crank arm then moves alone 270°. The total motion of each crank arm is 270° plus 45° or 315°.

For the overlapping output motions of FIGS. 8 and 9 (during overlap) the rear crank arm accelerates in its first 15° movement. The front crank arm 202 decelerates during the last 15° movement. These speed changes overlap for any crank arm motion overlap of zero to 55°. The crank arm motion overlap of zero is illustrated in FIG. 5, with the end to end output motion, to 45° overlap as illustrated in FIG. 9 increases the available solo crank arm stroke from 245° to 270°, respectively. Also, the total crank arm stroke is increased from 245° to 315°. For motion overlap of 45° or greater, the solo crank arm stroke plus overlap is 315°. The solo motion thus decreases from 270° to zero as motion overlap is increased from 45° to 315° which is the maximum as illustrated in FIG. 8. Solo motion may be decreased without affecting overlap, equally or unequally by decreasing the input stroke, changing the point at which solo motion starts and stops on one or both sides of the overlap portion of the input stroke.

Figure 10:
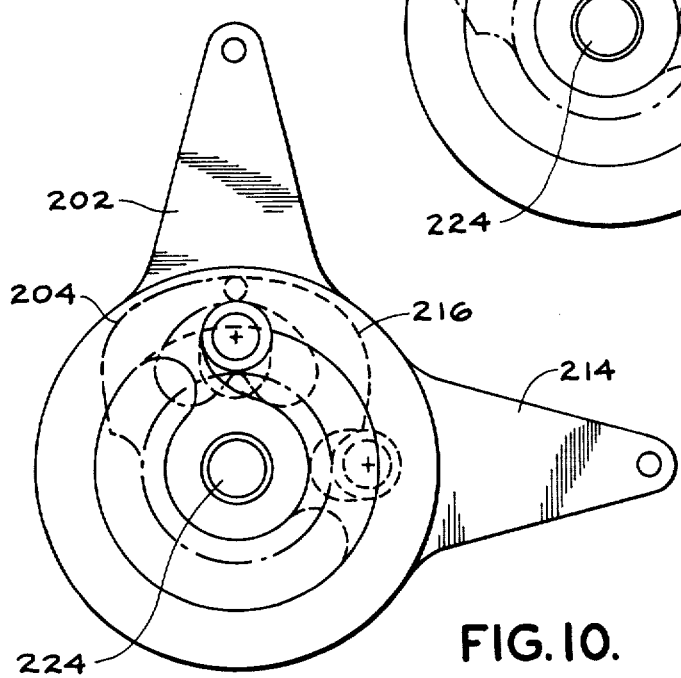
FIG. 10 is an end view of the pair of adjacent modules of FIG. 5 re-arranged for yet another alternative sequencing operation.

Referring now to FIG. 10, there is illustrated a third sequencing operation wherein overlapping dwell occurs; that is, both crank arms are stationary during an overlapping period. FIG. 10 again illustrates a pair of adjacent modules in end view with the front housing removed. As shown in FIG. 10 the crank arms and drive fittings are illustrated for maximum overlapping dwell angle. The dwell angle or stroke refers to the motion of the input drive fittings. In comparison to FIG. 5, the drive fittings of the rear module of FIG. 10 have been reset on their respective splines, rotating them clockwise 270°.

For a counter-clockwise input, the drive fittings of FIG. 10 move 270° for a maximum dwell. There is no crank motion during this period for this extreme setting of FIG. 10. In order to obtain output from FIG. 10, it is necessary to reset the rear drive fittings 216 in a counter-clockwise direction. The fittings are reset at an angle from zero to 40° increasing the crank stroke from zero to 15°, respectively. For a great angle of the drive fitting from 40° to 270°, the crank arm stroke is increased from 15° to 245°. Thus, the crank arm stroke angle is equal to the reset angle minus 25°. To express the dwell angle in terms of the reset angle for any reset angle from zero crank motion at maximum dwell (shown in FIG. 10) to 270° crank motion at zero dwell (shown in FIG. 5), the dwell angle is equal to 270° minus the reset angle. Thus, the reset angle is equal to 270° minus the dwell angle.

The dwell and crank angles can be expressed in terms of each other for a reset angle of from 40° to 210° by the following:

Dwell Angle = 270° — Reset angle = 270° — crank angle — 25°.
Dwell angle = 245° — crank angle.
Crank angle = 245° — dwell angle.

Further modifications of the system are possible. For example, two output modules can be closely spaced together which will produce a minimum distance between their output cranks by utilizing a center bearing common to both modules. Additionally, it has been found that the crank structure can rotate on a large diameter bearing attached to the housing rather than the input shaft. This construction strengthens and stiffens the crank and permits a greater length of spline engagement of the drive fittings.

Additionally, very short crank arm lengths may be obtained by relocating the circular opening 64 to the disk portion of the crank 54 shown in FIG. 2, such relocation being permitted wherever the disk forms a clevis in the crank 54. The crank output arm 62 would then be an integral part of the disk.

I claim:
1. A mechanical sequencing module comprising:
   a rotatable drive shaft having a shaft spline formed thereon;
   a freely rotatable shaft having a plurality of rollers positioned thereon, the axis of the freely rotatable shaft having an axis parallel to and offset from the axis of the drive shaft;
   a drive fitting having an opening therein, said drive fitting being positioned on said drive shaft spline for rotating said fitting upon rotation of said drive shaft, and a finger portion for enabling said drive fitting to move said rollers and said freely rotatable shaft;
   a crank structure positioned in a plane perpendicular to the axes of said drive shaft and said freely rotatable shaft, said crank structure having a drive shaft opening through which said drive shaft passes, and a slot into which said freely rotatable shaft and one of said rollers extends for driving said crank structure during movement of said freely rotatable shaft; and
   a housing formed in a plane parallel to said crank structure, having a track formed therein, said track forming a guideway for said freely rotatable shaft and another of said rollers.

2. A mechanical sequencing module in accordance with claim 1 wherein said crank structure slot has a radially extending portion for enabling said roller in said slot to be radially displaced.

3. A mechanical sequencing module in accordance with claim 2 wherein said slot and a portion of said drive fitting surface enables said drive fitting to rotate a greater amount than said crank structure during said radial movement of said roller in said slot.

4. A mechanical sequencing module in accordance with claim 3 wherein said center roller bears against said slot enabling said crank structure to rotate during said radial displacement of said roller.

5. A mechanical sequencing module in accordance with claim 4 wherein said crank structure movement varies sinusoidally during said radial displacement of said center roller for preventing shock loads on said mechanism.

6. A mechanical sequencing module in accordance with claim 1 wherein said drive fitting, said crank structure and said housing end have at least one of said rollers operatively associated therewith.

7. A mechanical sequencing module in accordance with claim 1 wherein said module further comprises a second drive fitting and second housing positioned on a side of the crank structure opposite that of said housing and said drive fitting for producing a balanced load path in said module.

8. A mechanical sequencing module in accordance with claim 1 wherein said drive fitting contains a cam surface, a portion of which defines a circular base, for enabling said crank structure to dwell during an interval of rotation of said shaft.

9. A mechanical sequencing module in accordance with claim 1 and further comprising a second module rotatable on said first module shaft, the crank structures of said first and second modules being movable in overlapping output motion during rotation of said shaft.

10. A mechanical sequencing module in according with claim 9 wherein the amount of overlapping output motion of each of said crank structures is adjustable by repositioning said drive fittings on said drive shaft spline.

11. A mechanical sequencing module in accordance with claim 1 and further comprising a second module rotatable on said first module shaft, the crank structure of said first module commencing movement immediately upon termination of movement of said second crank structure during rotation of said shaft.

12. A mechanical sequencing module in accordance with claim 10 wherein the amount of movement of each of said crank structures is adjustable by repositioning said drive fittings on said drive shaft spline.

13. A mechanical sequencing module in accordance with claim 1 wherein said rollers on said freely rotatable shaft are freely rotatable.

14. A mechanical sequencing module in accordance with claim 3 wherein said drive fitting contains a cam finger for enabling said crank structure to accelerate and decelerate sinusoidally.

* * * * *